United States Patent
Takaki et al.

(10) Patent No.: US 10,437,221 B2
(45) Date of Patent: Oct. 8, 2019

(54) PRODUCTION SUPPORT SYSTEM AND PRODUCTION SUPPORT METHOD

(71) Applicant: Kabushiki Kaisha Toshiba, Minato-ku (JP)

(72) Inventors: Masaya Takaki, Yokohama (JP); Masaru Ogawa, Yokohama (JP); Keitaro Sumiya, Yokohama (JP); Shinji Terada, Yokohama (JP); Yuujiro Takahashi, Hiratsuka (JP); Yoshiaki Kohno, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 445 days.

(21) Appl. No.: 14/741,825

(22) Filed: Jun. 17, 2015

(65) Prior Publication Data

US 2016/0041549 A1 Feb. 11, 2016

(30) Foreign Application Priority Data

Aug. 7, 2014 (JP) .................................. 2014-161379

(51) Int. Cl.
*G05B 19/12* (2006.01)

(52) U.S. Cl.
CPC .. *G05B 19/128* (2013.01); *G05B 2219/31322* (2013.01)

(58) Field of Classification Search
CPC .................... G05B 19/128; G05B 2219/31322
See application file for complete search history.

(56) References Cited

U.S. PATENT DOCUMENTS

| | | | | |
|---|---|---|---|---|
| 5,635,850 A | * | 6/1997 | Ogura | H01L 22/20 257/E21.525 |
| 6,589,801 B1 | * | 7/2003 | Yoon | H01L 22/20 257/E21.525 |
| 6,751,519 B1 | * | 6/2004 | Satya | H01L 22/20 700/109 |
| 2002/0077714 A1 | * | 6/2002 | Takeuchi | G06Q 10/06 700/95 |
| 2003/0120457 A1 | * | 6/2003 | Singh | G01R 31/287 702/181 |
| 2005/0073875 A1 | * | 4/2005 | Tohyama | G11C 29/814 365/154 |

(Continued)

FOREIGN PATENT DOCUMENTS

| | | |
|---|---|---|
| JP | 4-347769 | 12/1992 |
| JP | 5-135068 A | 6/1993 |

(Continued)

*Primary Examiner* — Thomas C Lee
*Assistant Examiner* — Gary Collins
(74) *Attorney, Agent, or Firm* — Oblon, McClelland, Maier & Neustadt, L.L.P.

(57) ABSTRACT

According to one embodiment, a production support system for supporting a production method for a product to which a model number is allocated in a course of production. The system includes a predicted model number calculation unit which to calculate a predicted model number for a work-in-process to which the model number is not allocated, on the basis of information about the work-in-process to which the model number is not allocated in the course of production, a requirement of the model number that is found in advance, and model number allocation condition information.

20 Claims, 1 Drawing Sheet

(56) References Cited

U.S. PATENT DOCUMENTS

| | | | | |
|---|---|---|---|---|
| 2006/0190206 A1* | 8/2006 | Huang | ............... | G01R 31/2894 |
| | | | | 702/117 |
| 2008/0140330 A1* | 6/2008 | Morioka | ................ | G05B 15/02 |
| | | | | 702/81 |
| 2009/0276075 A1* | 11/2009 | Good | ..................... | G06Q 10/06 |
| | | | | 700/110 |
| 2009/0276174 A1* | 11/2009 | Good | ............... | G05B 19/41875 |
| | | | | 702/81 |
| 2012/0136470 A1* | 5/2012 | Deans | ............. | G05B 19/41875 |
| | | | | 700/110 |

FOREIGN PATENT DOCUMENTS

| | | |
|---|---|---|
| JP | 11-48102 | 2/1999 |
| JP | 2002-149227 | 5/2002 |
| JP | 2002-361527 A | 12/2002 |
| JP | 2004-199168 | 7/2004 |
| JP | 2006-99691 A | 4/2006 |
| JP | 2007-323163 A | 12/2007 |
| JP | 2010-537328 A | 12/2010 |
| JP | 2012-141806 | 7/2012 |
| JP | 2013-33450 | 2/2013 |

\* cited by examiner

PRODUCTION SUPPORT SYSTEM AND PRODUCTION SUPPORT METHOD

CROSS-REFERENCE TO RELATED APPLICATIONS

This application is based upon and claims the benefit of priority from Japanese Patent Application No. 2014-161379, filed on Aug. 7, 2014; the entire contents of which are incorporated herein by reference.

FIELD

Embodiments described herein relate generally to a production support system and a production support method.

BACKGROUND

In the case of multiple-product type production, a "model number" that is an identification indicator of the model of a product is allocated in order to identify the product type, the customer and the like.

Generally, in the most upstream process (for example, a component input process or the like) of production processes, a desired model number is allocated to an object. A plurality of processes (for example, an assembly process and inspection process or the like) that is defined by model number is carried out, and the product is thus completed by model number. The completed product is then shipped.

However, depending on the product type, a model number cannot be allocated at the beginning of production in some cases. For example, in the case where different product types are generated according to the quality grade of the product or where the product can be sold only to limited customers, different model numbers may be allocated according to the result of the inspection process or the like.

In such cases, what model number will be ultimately allocated to a work-in-process that is between the most upstream process of production processes and the process where a model number is allocated, is unknown. Therefore, it is difficult to grasp the number of products by model number.

Consequently, it is difficult to achieve production management such as progress management, start control, and input control, which are considered important to multiple-product type production.

DETAILED DESCRIPTION

Figure 1:
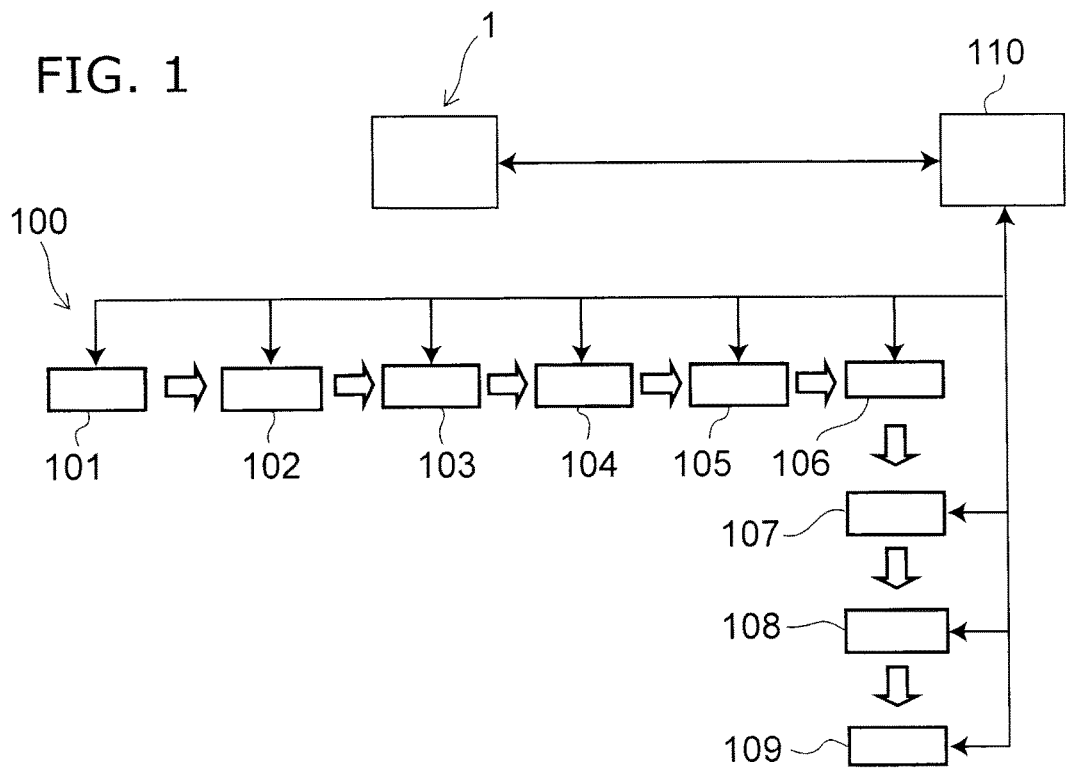
FIG. 1 is a block diagram for illustrating the relationship between a production support system 1 according to the embodiment and a product production process 100.

In general, according to one embodiment, a production support system for supporting a production method for a product to which a model number is allocated in a course of production. The system includes a predicted model number calculation unit which to calculate a predicted model number for a work-in-process to which the model number is not allocated, on the basis of information about the work-in-process to which the model number is not allocated in the course of production, a requirement of the model number that is found in advance, and model number allocation condition information.

Hereinafter, an embodiment will be illustrated with reference to the drawings. In the drawings, similar components are denoted by the same reference numbers and detailed description thereof is omitted when appropriate.

FIG. 1 is a block diagram for illustrating the relationship between a production support system 1 according to the embodiment and a product production process 100.

As shown in FIG. 1, the product production process 100 includes a first assembly process 101, a second assembly process 102, a first inspection process 103, a second inspection process 104, a third inspection process 105, a model number allocation process 106, a fourth inspection process 107, a packing process 108, and a fifth inspection process 109.

A control unit 110 which provides control information to devices provided in the respective processes and which acquires desired information from the devices provided in the respective processes is provided.

The first assembly process 101 can be, for example, the process of assembling mechanical components, or the like. The first assembly process 101 can be, for example, the process of screwing mechanical components, bonding mechanical components, welding mechanical components, caulking mechanical components, fitting mechanical components together, or the like.

The second assembly process 102 can be, for example, the process of assembling electrical components, or the like. The second assembly process 102 can be, for example, the process of assembling a motor, sensor or the like, or the process of soldering a wire, semiconductor device or the like.

It should be noted that the specific details of the first assembly process 101 and the second assembly process 102 are not limited to those illustrated and can be properly changed according to the product to be produced.

Also, the number of assembly processes is not particularly limited and can be properly changed according to the product to be produced.

The first inspection process 103 can be, for example, the process of performing mechanical inspection or the like. The first inspection process 103 can be, for example, the process of inspecting the rigidity of the product, the dimension of the product, the color of the product, the mechanical operation of the product, the sound volume, the quantity of heat, the quantity of light, the air volume, or the like.

The second inspection process 104 can be, for example, the process of performing electrical inspection. The second inspection process 104 can be, for example the process of inspecting frequency characteristics, voltage resistance, insulation property or the like.

The third inspection process 105 can be, for example, the process of inspecting the appearance or the like.

The specific details of the first inspection process 103, the second inspection process 104, and the third inspection process 105 are not limited to those illustrated and can be properly changed according to the product to be produced.

Also, the number of inspection processes is not particularly limited and can be properly changed according to the product to be produced.

The model number allocation process 106 can be, for example, the process of allocating a model number on the basis of the results of the inspections in the first inspection process 103, the second inspection process 104, and the third inspection process 105.

For example, in some cases, depending on the product type, different model numbers may be allocated to the product according to the quality grade of the product, such as first-class product or second-class product.

In the model number allocation process 106, a model number is allocated on the basis of the results of the inspections and a predetermined standard or the like.

In the model number allocation process 106, component information in the first assembly process 101 and the second assembly process 102 may be taken into consideration.

The fourth inspection process 107 can be, for example, the process of performing final inspection.

The fourth inspection process 107 can be, for example, the process of inspecting the quality of the product and the number of products or the like, by model number, on the basis of predetermined product specifications or the like.

In this case, in the fourth inspection process 107, all-products inspection may be carried out, or sampling inspection may be carried out.

The packing process 108 can be, for example, the process of packing the product or the like.

The fifth inspection process 109 can be, for example, the process of performing sampling inspection for quality management, or the like.

The control unit 110 acquires desired information from devices provided in the respective processes.

The acquired information is provided to the production support system 1 and stored, for example, in a production information storage unit 11.

The information to be acquired is, for example, location information of a work-in-process, inspection result, model number allocation condition information and the like, which will be described below.

A work-in-process is an unfinished product that is still in the course of production.

The control unit 110 decides a component, material and the like to be inputted to the product production process 100 and changes and eliminates an inspection condition in the inspection processes, using a predicted model number calculated by a predicted model number calculation unit 13, prediction of the time of completion of the work-in-process calculated by a completion prediction calculation unit 14, and a result of analysis by an analysis unit 15, which will be described below.

It should be noted that the product production process 100 is not limited to the illustrated one.

The product production process 100 may include, for example, a process where a model number is allocated in the course of production of the product.

The product production process 100 may include, for example, at least an inspection process and a model number allocation process.

Also, known devices can be used for the devices used in the assembly processes, the inspection processes and the packing process, and therefore will not be described further in detail.

Next, the production support system 1 according to the embodiment will be illustrated.

Figure 2:
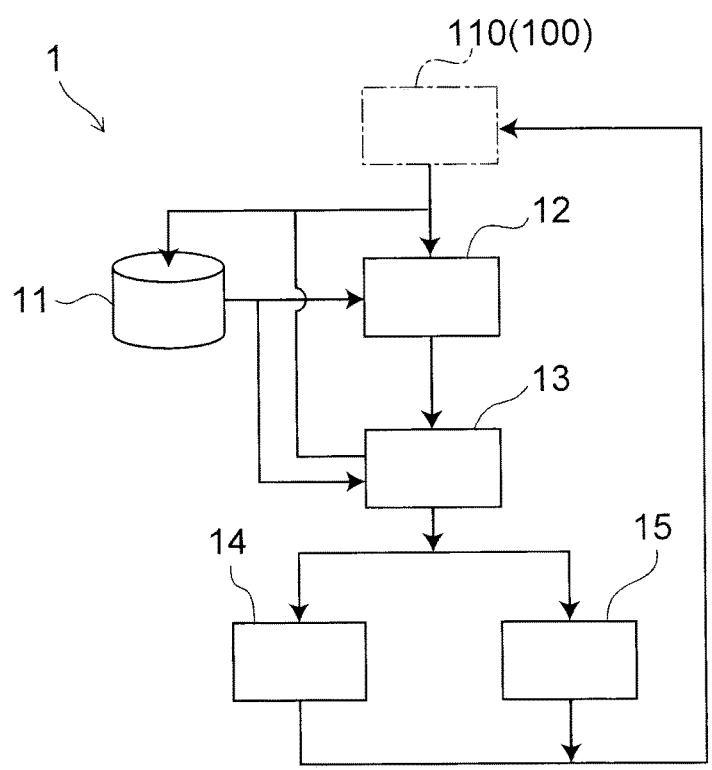
FIG. 2 is a block diagram for illustrating the production support system 1 according to the embodiment.

FIG. 2 is a block diagram for illustrating the production support system 1 according to the embodiment.

As shown in FIG. 2, the production support system 1 includes the production information storage unit 11, a requirement information calculation unit 12, and the predicted model number calculation unit 13.

The production information storage unit 11 stores information about a product production schedule, information about a work-in-process in the product production process 100, model number allocation condition information, information about the number of remaining required products with a priority order given, which is to be provided to the requirement information calculation unit 12, and information about a predicted model number provided from the predicted model number calculation unit 13, or the like.

The information about the production schedule can include, for example, the number of products scheduled to be produced by model number, the number of finished products (number of products in stock), time and date (for example, scheduled date of completion and date of delivery o the like), or the like.

The information about the work-in-process is information that influences the model number decision, the location information of the work-in-process, or the like.

The information that influences the model number decision is the type of the product, the components and materials of the product, inspection details, inspection results or the like.

The location information of the work-in-process is, for example, the process at the time when the information about the work-in-process is acquired, the time when the foregoing process is ended, or the like.

The model number allocation condition information can be, for example, information representing the relationship between a model number that is defined in advance as production specification and the information that influences the model number decision.

The relationship between the model number that is defined in advance as production specifications and the information that influences the model number decision can be, for example, information representing the relationship between components and materials, inspection details, inspection results at the time, and a specific model number.

The information stored in the production information storage unit 11 is provided to the requirement information calculation unit 12 and the predicted model number calculation unit 13.

The requirement information calculation unit 12 calculates the number of remaining required products (number of products lacking) with a predetermined model number.

The requirement information calculation unit 12 extracts, for example, the number of products scheduled to be produced by model number, the number of finished products, the scheduled date of completion or the like, from the information stored in the production information storage unit 11.

The requirement information calculation unit 12 also extracts, for example, the number of works-in-process with a model number allocated thereto, on the basis of the information provided from the control unit 110.

The works-in-process with a model number allocated thereto are, for example, the products in the model number allocation process 106, the fourth inspection process 107, and the packing process 108.

The number of remaining required products with a predetermined model number can be found by subtracting the number of finished products and the number of works-in-process with a model number allocated thereto, from the number of products scheduled to be produced by model number.

The number of remaining required products with a predetermined model number is found by model number.

At this time, the number of remaining required products with a predetermined model number can be found, giving priority to a model number with a similar scheduled date of completion or similar date of delivery or the like.

If the scheduled date of completion, the date of delivery or the like is the same, for example, the number of remaining required products with a predetermined model number can be found, giving priority to a model number with a smaller number of remaining required products.

If there is no particular priority order, the number of remaining required products with a predetermined model number can be found in order of the name of model number (for example, in alphabetical order or the like).

If there is a plurality of production schedules, the number of remaining required products with a predetermined model number can be found, giving priority to an older production schedule.

The number of remaining required products that is found can be stored in the production information storage unit 11 or provided to the predicted model number calculation unit 13.

The predicted model number calculation unit 13 calculates a predicted model number for each work-in-process having no model number allocated thereto.

The work-in-process having no model number allocated thereto is, for example, an unfinished product in the course of production that is in the first assembly process 101 to the third inspection process 105, or a product before the allocation of a model number, or the like.

First, the predicted model number calculation unit 13 extracts, for example, the information about the work-in-process and the model number allocation condition information from the information stored in the production information storage unit 11.

Next, the predicted model number calculation unit 13 predicts, for example, a model number of the work-in-process having no model number allocated thereto, on the basis of the information about the work-in-process having no model number allocated thereto and the model number allocation condition information.

That is, what model number will be allocated to each work-in-process having no model number allocated thereto that is currently in the product production process 100 is predicted, using the model number allocation condition information, which is the past record information.

At this time, first, all the candidates of the model number to be allocated are found for each work-in-process.

If the model number allocation condition information includes no candidate of the model number to be allocated, information that there is no candidate of a predicted model, described below, is found.

Next, the predicted model number calculation unit 13 finds a predicted model number from among the candidates of the model number to be allocated.

The predicted model number is found in order from a work-in-process in a process close to the model number allocation process 106.

In this case, for example, on the basis of the information about the number of remaining required products with a priority order given thereto, provided from the requirement information calculation unit 12, the model number with the highest priority can be extracted from the candidates of the model number to be allocated, and the extracted model number can be used as a predicted model number.

For example, if a model number with a closer scheduled date of completion, a closer date of delivery or the like is found among the candidates of the model number to be allocated, that model number can be used as a predicted model number, taking the number of remaining required products as a limit.

Meanwhile, if no particular model number to be given priority is found among the candidates of the model number to be allocated, information to that effect can be found, or a predicted model number can be found according to a predetermined rule (for example, in alphabetical order or the like).

That is, the predicted model number calculation unit 13 calculates a predicted model number for the work-in-process having no model number allocated thereto, on the basis of the information about the work-in-process having no model number allocated thereto in the production process, a model number requirement that is found in advance, and the model number allocation condition information.

The model number requirement is, for example, information about the specifications of the product that are defined for each of a plurality of model numbers.

The predicted model number that is found can be, for example, stored in the production information storage unit 11 or provided to the control unit 110.

Also, the calculations by the requirement information calculation unit 12 and the predicted model number calculation unit 13 are carried out successively according to the progress of the production. That is, the number of remaining required products having a predetermined model number and the predicted model number change successively according to the progress of the production.

The predicted model number calculation unit 13 can also carry out inspection result estimation processing, as follows, before finding candidates of the model number for each work-in-process. By carrying out the inspection result estimation processing, prediction accuracy can be increased.

For example, with respect to a work-in-process on which the inspections in the inspection processes 103 to 105 preceding the model number decision process are not carried out yet, inspection results are decided using the past record information of the inspection results. If the inspection results are decided, constraints on the model number decision increase, and therefore the candidates of the model number can be reduced. If the candidates of the model number can be reduced, prediction accuracy can be increased.

Thus, prediction accuracy can be improved significantly, particularly in the case of a product or production where the inspection results vary largely (for example, first-class product, second-class product or the like), or where the inspection results are largely due to the model number decision.

Specifically, for example, the processing can be carried out as follows.

First, the production information storage unit 11 stores past record information of inspection results in advance.

The past record information of inspection results can be, for example, each component, inspection details up to the process before the inspection process, the probability of occurrence of an inspection result such as first-class product or second-class product with respect to the combination of each component and inspection detail (by taking a moving average during the most recent several days to several weeks, or the like), or the like.

Next, the predicted model number calculation unit 13 carries out inspection result estimation processing before finding a candidate of the model number.

A work-in-process that has just begun to be processed in the inspection process has no information about inspection results. Therefore, with respect to the work-in-process that has just begun to be processed in the inspection process, an inspection result is allocated on the basis of the past record information of inspection results stored in the production information storage unit 11 (that is, the probability of occurrence of inspection results).

For example, it is assumed that there are 200 works-in-process with the same component and the same inspection detail, in the inspection process 103. Meanwhile, it is assumed that, among works-in-process with the combination of the component in question and the inspection detail in question in the inspection process 103, the probability of occurrence of first-class product during the past two weeks is 30% and the probability of occurrence of second-class product is 70%.

In this case, the first 60 of the 200 works-in-process are regarded as first-class products, and the subsequent 140 are regarded as second-class products. This information is registered to the production information storage unit 11 as work-in-process information.

The order of allocating inspection results may be the same as the order of allocating requirements and works-in-process, or a different method may be employed (for example, in alphabetical order).

According to the production support system 1 according to the embodiment, a predicted model number can be allocated to each work-in-process having no model number allocated thereto.

The numbers of works-in-process by model number and by process are found, for example, on the basis of the predicted model number, and are compared with the production schedule. Thus, the numbers of products that are redundant or lacking by model number and by process can be found.

On the basis of the resulting numbers of products that are redundant or lacking, the component, material and the like to be inputted to the product production process 100 can be decided.

That is, proper start control, input control of components or the like, restraint on excess input, and reduction of works-in-process in stock can be carried out.

Also, since defect risk decreases and thus reduces the loss due to re-inputting a component or the like in order to produce a produce with a specific model number, the overall production lead time can be reduced consequently.

Moreover, since a work-in-process in a process downstream from the model number allocation process 106 can be use the model number allocated thereto and a work-in-process in an upstream process can use the predicted model number, progress management accuracy by model number and by process can be improved.

Therefore, even in the case where a model number is allocated in the course of production, proper production management can be carried out.

As shown in FIG. 2, the production support system 1 can further include a completion prediction calculation unit 14.

The completion prediction calculation unit 14 predicts the timing of completion of a work-in-process in the product production process 100.

First, the completion prediction calculation unit 14 finds the probability that a work-in-process in the product production process 100 will be completed within a predetermined number of days and become a product with a predetermined model number (probability of attainment).

Depending on the model number, the defect rate and the lead time to completion may vary in some cases. Therefore, depending on the model number, the probability of attainment may have different values in some cases.

Thus, the probability of attainment is found by model number.

The probability of attainment can be found on the basis of past record data.

The probability of attainment $P_{ik}$ can be found, for example, by the following equation.

$$p_{ik} = \frac{\sum_j Y_{ijk}}{\sum_j X_{ij}}$$

Here, $X_{ij}$ is the number of works-in-process having a predetermined model number that are in a process i on a j-day.

$Y_{ijk}$ is the number of works-in-process that are complete as products having the model number after k days, of the works-in-process having the predetermined model number that are in the process i on the j-day.

Next, the completion prediction calculation unit 14 calculates the number of products having the predetermined model number that will be complete after a predetermined date (number of products predicted to be complete).

The completion prediction calculation unit 14 finds, for example, the number of products that will be complete after k days (number of products predicted to be complete), of the works-in-process having the predetermined model number that are in the process i on the j-day.

In this case, the numbers of works-in-process by process and by model number at a reference point time for prediction can be multiplied by the probability of attainment $P_{ik}$, thus calculating the number of products predicted to be complete).

The number of products predicted to be complete can be found, for example, by the following equation.

$$\sum_i W_i P_{ik}$$

Here, $W_i$ is the number of works-in-process having a predetermined model number that are in a process i on a j-day.

That is, the completion prediction calculation unit 14 finds the probability that a work-in-process in the course of production will become a product with a predetermined model number and be completed within a predetermined number of days, and calculates the number of products predicted to be complete, by the product of the probability found and the number of works-in-process in the course of production.

In this case, the number of products predicted to be complete can be totaled by model number or by period.

When finding the number of products predicted to be complete, the allocated model number can be used for a work-in-process in a process downstream from the model number allocation process 106, and the predicted model number can be used for a work-in-process in a process upstream from the model number allocation process 106.

By providing the completion prediction calculation unit 14, more appropriate production management can be carried out on the basis of the number of products predicted to be complete.

In this case, the number of products predicted to be complete that takes inspection information or the like of works-in-process into account and therefore is highly accurate can be reflected on the next production schedule.

Consequently, the rate of on-time delivery by the factory can be raised, leading to reduction in the loss of sales opportunities in business operations.

As shown in FIG. 2, the production support system 1 can further include the analysis unit 15.

As described above, if the acquired inspection result or the like is not found in the model number allocation condition information, a predicted model number cannot be found.

The analysis unit 15 analyzes the cause of not finding a predicted model number, with respect to a work-in-process for which a predicted model number is not found.

For example, the analysis unit 15 eliminates conditions one by one from the information that influences the model number decision in the process, in order from a process closer to the model number allocation process 106, of processes upstream from the model number allocation process 106.

In the inspection processes, for example, inspection results, inspection conditions or the like are eliminated one by one.

In the assembly processes, for example, conditions such as the components and materials of the product are eliminated one by one.

In this case, conditions are eliminated one by one in the reverse direction of the process flow in the process.

For example, the condition at the end of the process flow is eliminated first, and the condition at the beginning of the process flow is eliminated last.

If conditions are eliminated, the number of candidates of the model number to be allocated will increase.

Therefore, if a predicted model number is found by eliminating a condition, the eliminated condition can be considered to be the cause.

That is, the analysis unit 15 eliminates conditions one by one from the information that influences the model number decision, in order from a process closer to the process of allocating a model number in the course of production, with respect to a work-in-process for which a predicted model number is not found.

Then, if a predicted model number is found by eliminating a condition, the analysis unit 15 specifies the eliminated condition at this time as the cause of not finding a predicted model number.

The condition thus specified can be reflected on the production schedule.

For example, in the next production, the specified condition can be changed or eliminated.

As described above, the production support method according to the embodiment is a production support method for supporting a production method for a product to which a model number is allocated in the course of production.

The production support method according to the embodiment includes the process of finding a predicted model number to a work-in-process having no model number allocated thereto, on the basis of information about the work-in-process having no model number allocated thereto in the course of production, a requirement of a model number that is found in advance, and model number allocation condition information.

Also, the production support method according to the embodiment can further include the process of finding the probability that a work-in-process in the course of production will be completed within a predetermined number of days and become a product with a predetermined model number, and then finding the number of products predicted to be complete, by the product of the probability found and the number of works-in-process in the course of production.

Moreover, the production support method according to the embodiment can further include the process of eliminating conditions one by one from information that influences model number decision, in order from a process closer to the process of allocating a model number in the course of production, with respect to a work-in-process for which a predicted model number is not found, and if a predicted model number is found, specifying the condition eliminated at the time, as the cause of not finding a predicted model number.

As described above, according to the production support system and the production support method according to the embodiment, proper progress management, proper start control, and proper input control can be realized in the circumstance where a model number is allocated in the course of production.

The realization of such proper production management is linked with the restraint on excess input, reduction of works-in-process in stock, and reduction in lead time.

Therefore, problems in business management such as improvement of cash flow and maximization of sales opportunities can be solved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A production support system that allocates a predicted model number to a work-in-process in a process prior to a process of allocating a model number, the system comprising:

circuitry configured to calculate the predicted model number for the work-in-process which is not allocated the model number among candidates of the model number to be allocated, wherein the circuitry is configured to calculate the predicted model number on the basis of information about the work-in-process which is not allocated the model number in a course of product production, a requirement of the model number that is found in advance, model number allocation condition information which is past record information, and information about a number of remaining required products to be produced in the course of product production, the circuitry is configured to allocate the predicted model number calculated to the work-in-process in the process prior to the process of allocating the model number to a finished product of the course of product production, and the circuitry is configured to manage the course of product production by controlling at least one of progress management, start control, and input control for one or more product being produced based on the predicted model number calculated that is allocated to the work-in-process.

2. The system according to claim 1, wherein the model number varies and is allocated to a product according a quality grade of the product.

3. The system according to claim 1, wherein the circuitry is further configured to find a probability that a work-in-process in the course of production with a predetermined model number will be completed within a predetermined number of days, and to calculate a number of products predicted to be complete by a product of the probability found and a number of works-in-process in the course of production.

4. The system according to claim 1, wherein the circuitry is further configured to, with respect to another work-in-process to which the predicted model number is not found, eliminate conditions one by one from information that influences a model number decision in order from a process closer to a process of allocating a model number in the course of production, and when the predicted model number is found, to specify a condition eliminated at a time, as a cause of not finding the predicted model number.

5. The system according to claim 4, wherein the information that influences the model number decision is at least one selected from the group consisting of a type of a product, a component of the product, a material of the product, an inspection detail of the product, and an inspection result of the product.

6. The system according to claim 1, wherein the information about the work-in-process is information that influences a model number decision or location information of the work-in-process.

7. The system according to claim 6, wherein the location information of the work-in-process is at least one of a process at a time when the information about the work-in-process is acquired, and a time when the process is ended.

8. The system according to claim 1, wherein the requirement of the model number is information about specifications of a product defined for each of a plurality of the model numbers.

9. The system according to claim 1, wherein the model number allocation condition information is information representing a relationship between the model number and information that influences a model number decision.

10. The system according to claim 1, wherein the work-in-process is an unfinished product in the course of production.

11. A production support method that allocates a predicted model number to a work-in-process in a process prior to a process of allocating a model number, the method comprising:
calculating, with circuitry, the predicted model number for the work-in-process which is not allocated the model number on the basis of information about the work-in-process among candidates of the model number to be allocated in a course of product production, a requirement of the model number that is found in advance, model number allocation condition information which is past record information, and information about a number of remaining required products to be produced in the course of product production;
allocating, with the circuitry, the predicted model number calculated to the work-in-process in the process prior to the process of allocating the model number to a finished product of the course of product production; and
managing, with the circuitry, the course of product production by controlling at least one of progress management, start control, and input control for one or more product being produced based on the predicted model number calculated that is allocated to the work-in-process.

12. The method according to claim 11, wherein the model number varies and is allocated to a product according a quality grade of the product.

13. The method according to claim 11, further comprising finding a probability that a work-in-process in the course of production with a product with a predetermined model number will be completed within a predetermined number of days, and finding a number of products predicted to be complete by a product of the probability found and a number of works-in-process in the course of production.

14. The method according to claim 11, further comprising, with respect to another work-in-process to which the predicted model number is not found, eliminating conditions one by one from information that influences a model number decision, in order from a process closer to a process of allocating a model number in the course of production, and when the predicted model number is found, specifying a condition eliminated at a time, as a cause of not finding the predicted model number.

15. The method according to claim 14, wherein the information that influences the model number decision is at least one selected from the group consisting of a type of a product, a component of the product, a material of the product, an inspection detail of the product, and an inspection result of the product.

16. The method according to claim 11, wherein the information about the work-in-process is information that influences a model number decision or location information of the work-in-process.

17. The method according to claim 16, wherein the location information of the work-in-process is at least one of a process at a time when the information about the work-in-process is acquired, and a time when the process is ended.

18. The method according to claim 11, wherein the requirement of the model number is information about specifications of a product defined for each of a plurality of the model numbers.

19. The method according to claim 11, wherein the model number allocation condition information is information representing a relationship between the model number and information that influences a model number decision.

20. The method according to claim 11, wherein the work-in-process is an unfinished product in the course of production.

* * * * *